(12) United States Patent
Jaramillo

(10) Patent No.: US 12,072,825 B2
(45) Date of Patent: Aug. 27, 2024

(54) DETECTOR CIRCUIT FOR START SIGNALING IN AN eUSB REPEATER

(71) Applicant: NXP USA, Inc.

(72) Inventor: Kenneth Jaramillo, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 18/073,498

(22) Filed: Dec. 1, 2022

(65) Prior Publication Data

US 2024/0184729 A1 Jun. 6, 2024

(51) Int. Cl.
G06F 13/40 (2006.01)
G06F 13/38 (2006.01)
G06F 13/42 (2006.01)

(52) U.S. Cl.
CPC ........ *G06F 13/4045* (2013.01); *G06F 13/385* (2013.01); *G06F 13/4291* (2013.01)

(58) Field of Classification Search
None
See application file for complete search history.

(56) References Cited

U.S. PATENT DOCUMENTS

| | | | | |
|---|---|---|---|---|
| 7,526,666 B1 * | 4/2009 | Soni | ............ | H03L 7/06 327/147 |
| 8,078,768 B2 | 12/2011 | Manor et al. | | |
| 8,471,607 B1 * | 6/2013 | Pace | ............ | H03K 21/026 327/117 |
| 8,829,957 B1 * | 9/2014 | Fluegel | ............ | H04L 7/10 327/146 |
| 10,014,957 B2 * | 7/2018 | Maung | ............ | G06F 13/4068 |
| 10,891,242 B2 | 1/2021 | Wente et al. | | |
| 2005/0229127 A1 * | 10/2005 | Warren | ............ | G06F 30/3312 716/108 |
| 2006/0176759 A1 * | 8/2006 | Rao | ............ | G11C 7/22 365/189.08 |
| 2007/0118674 A1 | 5/2007 | Ulenas | | |

(Continued)

FOREIGN PATENT DOCUMENTS

WO  2017112065 A1  6/2017

OTHER PUBLICATIONS

Apple, Inc. et al.; "Embedded USB2 (eUSB2) Physical Layer Supplement to the USB Revision 2.0 Specification"; Revision 1.2; 2018; 169 pgs.

*Primary Examiner* — Henry Tsai
*Assistant Examiner* — Aurangzeb Hassan

(57) ABSTRACT

A detector circuit is described for start signaling in an eUSB repeater. In an example, a circuit includes an analog differential transceiver configured to receive a differential data signal from a differential data bus and configured to drive a differential data signal to the differential data bus, an analog single-ended transceiver configured to receive a single-ended data signal from a single-ended data bus and configured to drive a single-ended data signal to the single-ended data bus, repeater logic coupled to the analog differential transceiver and the analog single-ended transceiver to repeat data signals between the differential data bus and the single-ended data bus, the repeater logic having an active state and a low power state, and a detection circuit coupled to the analog single-ended transceiver to detect a start signal on the single-ended data bus and to generate a wake signal to the repeater logic upon detecting the start signal.

16 Claims, 14 Drawing Sheets

(56) References Cited

U.S. PATENT DOCUMENTS

| | | | |
|---|---|---|---|
| 2010/0275037 A1* | 10/2010 | Lee | G06F 13/385 |
| | | | 713/323 |
| 2011/0273210 A1* | 11/2011 | Nagaraj | H03L 7/104 |
| | | | 327/159 |
| 2014/0253192 A1* | 9/2014 | Fluegel | H03L 7/00 |
| | | | 327/146 |
| 2015/0227489 A1* | 8/2015 | Chen | G06F 13/385 |
| | | | 710/313 |
| 2019/0042521 A1* | 2/2019 | Chen | G06F 13/4282 |
| 2020/0364174 A1* | 11/2020 | Chandra | H03K 3/0372 |
| 2022/0182063 A1* | 6/2022 | Gupta | H03L 7/0898 |
| 2022/0206983 A1* | 6/2022 | Erdogan | G06F 13/4282 |
| 2023/0065119 A1* | 3/2023 | Wentroble | G06F 9/4413 |

* cited by examiner

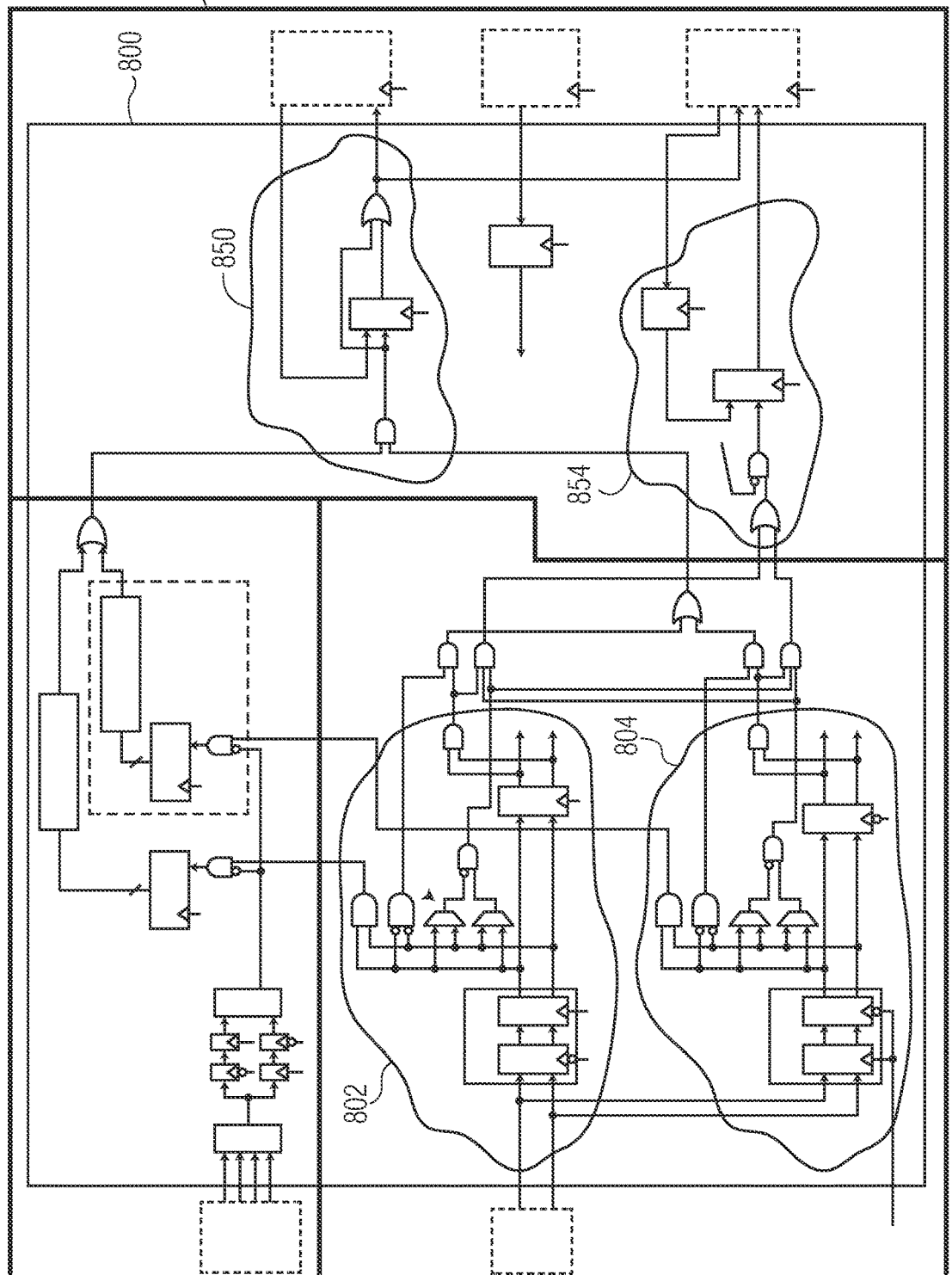

DETECTOR CIRCUIT FOR START SIGNALING IN AN eUSB REPEATER

BACKGROUND

Universal Serial Bus (USB) has been an extreme success as a standard for short-range wired data communication in the electronics industry. USB use is ubiquitous for peripheral devices, accessories, and internal connections and it continues to be the ascendant serial interconnect for electronic devices. USB was originally developed as a universal bus to connect a computer to external peripheral devices and accessories, for example, printers, scanners, keyboards, microphones, and gaming controllers. As the speed of the bus increased and the cost of supporting chips decreased, more types of devices were added. A part of the extreme success is backwards compatibility that allows a keyboard, 25 years old, designed for a 1.5 Mbps interface to be attached to a new 10 Gbps socket connector using the keyboard's original USB Type A-plug connector. The older Low-Speed 1.5 Mbps, Full-Speed 12 Mbps, and High-Speed 480 Mbps modes are still supported in all USB connectors.

USB is also being used as a high-speed data interface within many computers and portable devices. For example, a built-in camera, touch sensor, keypad, microphone, memory, and other devices may all be connected internally using USB. To improve these internal connections, embedded USB 2.0 (eUSB2) allows systems with advanced technology nodes to operate with USB 2.0 in Low Speed mode, Full Speed mode, and High Speed modes similar to USB 2.0 at lower cost. eUSB2 allows data to be carried at less cost on printed circuit board traces, when desired and without the power supply connections of USB.

To allow advanced USB Hosts and Devices to use advanced silicon device geometries, the eUSB2 Specification defines a lower signaling voltage than for external wired links and then defines an eUSB2 repeater as an interface between the two voltages. The repeater converts the lower voltages of eUSB2, used within advanced USB Hosts and Devices, to the higher voltages of USB signaling between devices and vice versa. In addition, during Low-Speed and Full-Speed modes, the repeater also translates the protocol timing between the eUSB2 and USB busses.

SUMMARY

Embodiments of a device and a method are disclosed. In an embodiment, an eUSB repeater with a detector circuit is disclosed. A detector circuit is described for start signaling in an eUSB repeater. In an example, a circuit includes an analog differential transceiver configured to receive a differential data signal from a differential data bus and configured to drive a differential data signal to the differential data bus, an analog single-ended transceiver configured to receive a single-ended data signal from a single-ended data bus and configured to drive a single-ended data signal to the single-ended data bus, repeater logic coupled to the analog differential transceiver and the analog single-ended transceiver to repeat data signals between the differential data bus and the single-ended data bus, the repeater logic having an active state and a low power state, and a detection circuit coupled to the analog single-ended transceiver to detect a start signal on the single-ended data bus and to generate a wake signal to the repeater logic upon detecting the start signal.

In an embodiment, the repeater logic is in the low power state upon receiving the wake signal. In an embodiment, the detection circuit has a suspend mode and wherein the repeater logic sends a reset signal to the detection circuit to place the detection circuit in the suspend mode when the repeater logic is the active state. In an embodiment, the repeater logic comprises high level logic, wherein the start signal comprises a start of control message, and wherein the detection circuit is configured to send the start of control message to the high level logic.

In an embodiment, the repeater is a device side eUSB repeater and the start signal comprises a start of wake signal. In an embodiment, the repeater is a host side eUSB repeater and the start signal comprises a start of resume signal. In an embodiment, the repeater logic has a first clock and the detection circuit has a second clock slower than the first clock.

In an embodiment, the detection circuit includes a clock, a positive section configured to detect a signal on a rising edge of the clock, a negative section configured to detect the signal on a falling edge of the clock, and a gate coupled to the positive section and the negative section to generate the wake signal in response to the positive section and the negative section detecting the signal.

In an embodiment, the detection circuit includes a clock, a first state element to detect the start signal on a rising edge of the clock, and a second state element coupled to the first state element to detect the start signal on a falling edge of the clock.

In an embodiment, the first state element is a first sync flop with a clock input coupled to the clock and wherein the second state element is a second sync flop with clock input coupled to the clock. In an embodiment, the repeater includes a counter coupled to the second state element to receive a signal transition and to determine a duration of the signal after the signal transition and before a next signal transition. In an embodiment, the counter generates a start of control message if the determined duration of the signal reaches a predetermined counter value. In an embodiment, the low power state includes an eUSB L2 state.

In an embodiment, a method includes setting repeater logic of an eUSB repeater to a low power state, setting a detection circuit of the eUSB repeater to an active state, detecting a start signal on a single-ended data bus at the detection circuit, and generating a wake signal to the repeater logic upon detecting the start signal.

In an embodiment, further includes receiving a reset signal at the detection circuit from the repeater logic when the repeater logic is in an active state. In an embodiment, detecting a start signal comprises detecting a start of control SCM message, the method further comprising sending the SCM to high level logic of the repeater.

In an embodiment, the method further includes receiving a signal transition of the single-ended bus at a counter, determining a duration of the signal after the signal transition and before a next signal transition, and generating a start of control message if the determined duration of the signal reaches a predetermined counter value.

In an embodiment a host eUSB repeater is disclosed. The device includes an analog differential transceiver configured to receive a USB signal from a USB bus coupled to a remote device and configured to drive a USB signal to the remote device on the USB bus, an analog single-ended transceiver configured to receive an eUSB signal from an eUSB bus coupled to a host and configured to drive an eUSB signal to the host on the eUSB bus, repeater logic coupled to the analog differential transceiver and the analog single-ended transceiver to repeat data signals between the USB bus and the eUSB bus, the repeater logic having an active state and a low power state, and a detection circuit coupled to the analog single-ended transceiver to detect a start of resume from the host on the eUSB bus and to generate a resume signal to the repeater logic upon detecting the start of resume (SOR).

In an embodiment, the detection circuit includes a first sync flop to detect the SOR on a rising edge of the clock, and a second sync flop coupled to the first sync flop to detect the SOR on a falling edge of the clock, wherein the SOR starts with both lines of the eUSB bus being driven high followed by one line going low for several milliseconds. In an embodiment, the detection circuit comprises an AND gate to compare a current detected SOR to a previous stored state of the eUSB bus to detect an SOR.

BRIEF DESCRIPTION OF THE DRAWINGS

FIGS. 8A to 8D are diagrams of a detector circuit suitable for detecting start conditions on the eUSB bus and then waking other circuitry.

DETAILED DESCRIPTION

Figure 1:
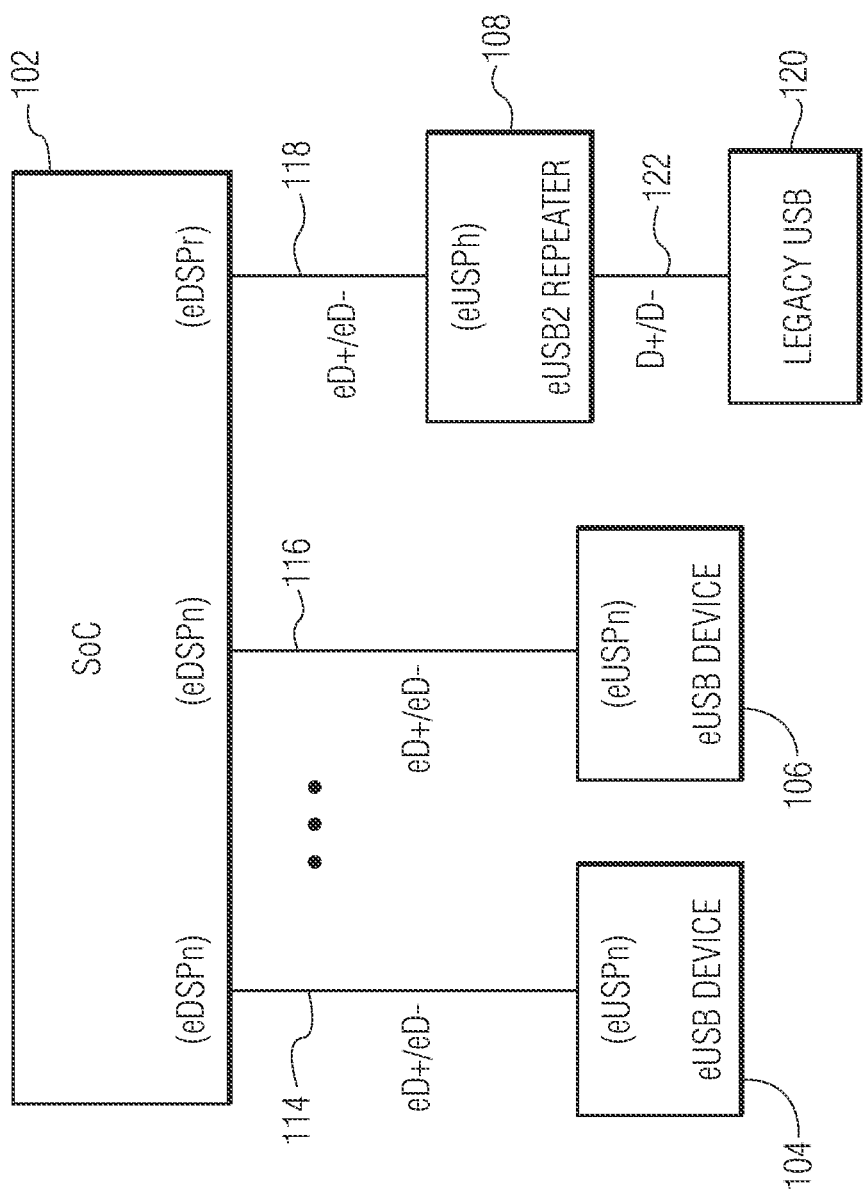
FIG. 1 is a block diagram of a system on a chip (SoC) that is coupled to multiple peripheral devices using eUSB.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

A signal detector circuit is described that operates on low power to quickly wake an eUSB repeater from a low power, suspend, standby, or sleep state. USB ports are often not all used and those that are connected to a device or host are often inactive. Accordingly, there are a variety of lower power states allowed for USB interfaces. On the other hand, unused ports must be able to detect and identify a new connection. Connected but inactive ports must be able to resume data communication quickly. The described signal detector circuit supports low power states and detects signals on the bus without using significant power.

For portable, mobile, and other battery-powered devices, saving power means longer battery life and a more enjoyable experience for the user. External USB ports are not connected most of the time. Desktop and fixed device power use is also important. A user only plugs a phone into a charger or other peripheral device for a small percentage of the time. Reduced power consumption for unused USB ports and for connected USB ports may significantly improve battery life. The USB standards define various low power states for low or no activity. USB 2.0 defines L1 and L2 suspend states. USB 3.0 defines U1, U2, and U3 states. By implementing these low power states, the protocol allows USB related devices, e.g., hosts, devices, hubs, repeaters, etc., to save significant power.

Semiconductor devices are typically configured to disable as much as possible during these low power states while still allowing quick enough wake up from the low power states. For USB, there are basic USB related activities that must be supported even in these low power states. For example, eUSB Control Messages may be issued while an eUSB repeater is in its suspend state. An eUSB host may issue a Start of Resume in order to wake one or more devices in the system while the host side eUSB repeater is in its suspend state. An eUSB device may issue a Start of Wake in order to wake the eUSB Host while the device side eUSB repeater is in its suspend state.

The eUSB2 Specification describes a supplement to USB 2.0 for low voltage, embedded use that operates in all three speed modes of USB 2.0: USB 1.0 Low Speed; USB 1.1 Full Speed; and USB 2.0 High Speed. Low Speed and Full Speed use single-ended signaling in eUSB2, while High Speed (sometimes called Hi-Speed) uses differential signaling in eUSB2. The eUSB2 Specification refers to repeater mode as eUSB2 to USB2 or as USB2 to eUSB2 regardless of the speed mode. In the present description "eUSB" will be used to refer to any modes of eUSB2 or any other suitable single-ended signaling system and "USB" will be used to refer to any modes of USB 2.0 or any other suitable modes of differential signaling. While the present description is presented in the context of Universal Serial Bus structures and methods, the structure and methods herein may be applied to translations between other single-ended and differential signaling systems. While the present description is presented in the context of Low Speed and High Speed mode, the present description may be applied to other modes and to successors of these modes, notwithstanding changes to the naming conventions that are used. It should be noted that USB has been implemented without consistently enforced naming conventions and that even these inconsistent naming conventions may be changed retroactively. Thus, it may happen that "USB 2.0" may soon be referred to primarily as "USB2."

FIG. 1 is a block diagram of a system on a chip (SoC) 102 that is coupled to multiple peripheral devices using eUSB. The SoC 102 is coupled to a first eUSB device 104 through an eUSB connection 114, which may be a single-ended connection in at least some modes. The SoC has a downstream eUSB2 port in native mode (eDSPn). The device has an upstream eUSB2 port in native mode (eUSPn). The connection 114 between these ports has lines with an eUSB2 data+ pin (eD+) and an eUSB2 data− pin (eD−). The eUSB connection 114 may be through PCB traces, wire lines, or any other suitable internal or embedded connection. An nth eUSB device 106 is coupled through an nth eUSB connection 116.

The SoC 102 is also coupled to one or more legacy USB devices 120. The SOC has a downstream eUSB2 port facing host repeater (eDSPr). That is connected through an eUSB connection 118 to an upstream eUSB2 port of the host repeater (eUSPh) at an eUSB2 repeater 108. The eUSB2 repeater 108 connects through a USB2 connection 122 to one or more legacy USB devices 120.

As shown, the SOC 102 operates in two modes of operation: native mode and repeater mode. The native mode refers to a host port, eDSPn of the SoC 102 communicating directly to native eUSB devices 104, 106 through a device port, eUSPn, both implementing an eUSB PHY and communicating based on eUSB signaling, for example eUSB2 signaling. Native mode eUSB is particularly suitable for inter-chip interconnect.

Repeater mode refers to an eUSB port, eDSPr, of the SoC 102 communicating with a USB port of a legacy USB device 120 through a repeater 108 that translates between eUSB signaling and USB signaling, for example eUSB2 and USB 1.0, USB 1.1 or USB 2.0 signaling.

Figure 2:
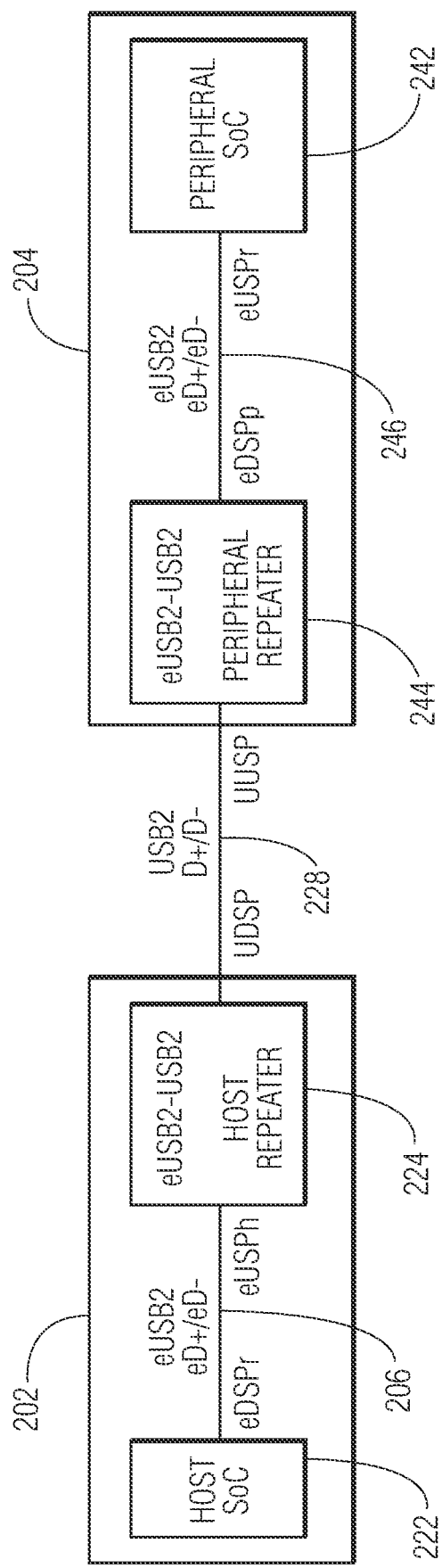
FIG. 2 is a block diagram of a host SoC coupled to a peripheral SoC connected through a USB line, for example a cable or PCB traces.

FIG. 2 is a block diagram of a host SoC 222 coupled to a peripheral SoC 242 connected through a USB line 228, for example a cable or PCB traces. In this example, the host SoC 222 is coupled through an eUSB link 206 with eD+/eD− lines to a host repeater 224. The peripheral SoC 242 is coupled through an eUSB link 246 with eD+/eD− lines to a peripheral repeater 244. The host repeater 224 and the peripheral repeater 244 are connected together using the USB line 228 with D+/D− lines. The host repeater 224 and the peripheral repeater 244 communicate with each other in a repeater mode, indicated as eUSB-USB. This configuration may be suitable for when two eUSB devices are connected through a USB line 228, for example a cable and USB connectors or ports at both sides of the device ports. The host SoC 222 and the peripheral SoC 242 are able to communicate using the lower voltage single-ended signaling that is more suitable for the physical construction of ICs while being connected using the more robust, higher voltage, USB differential signaling through the USB line 228. The host SoC and peripheral SoC may also be coupled to other devices (not shown) in native mode and in repeater mode.

Figure 3:
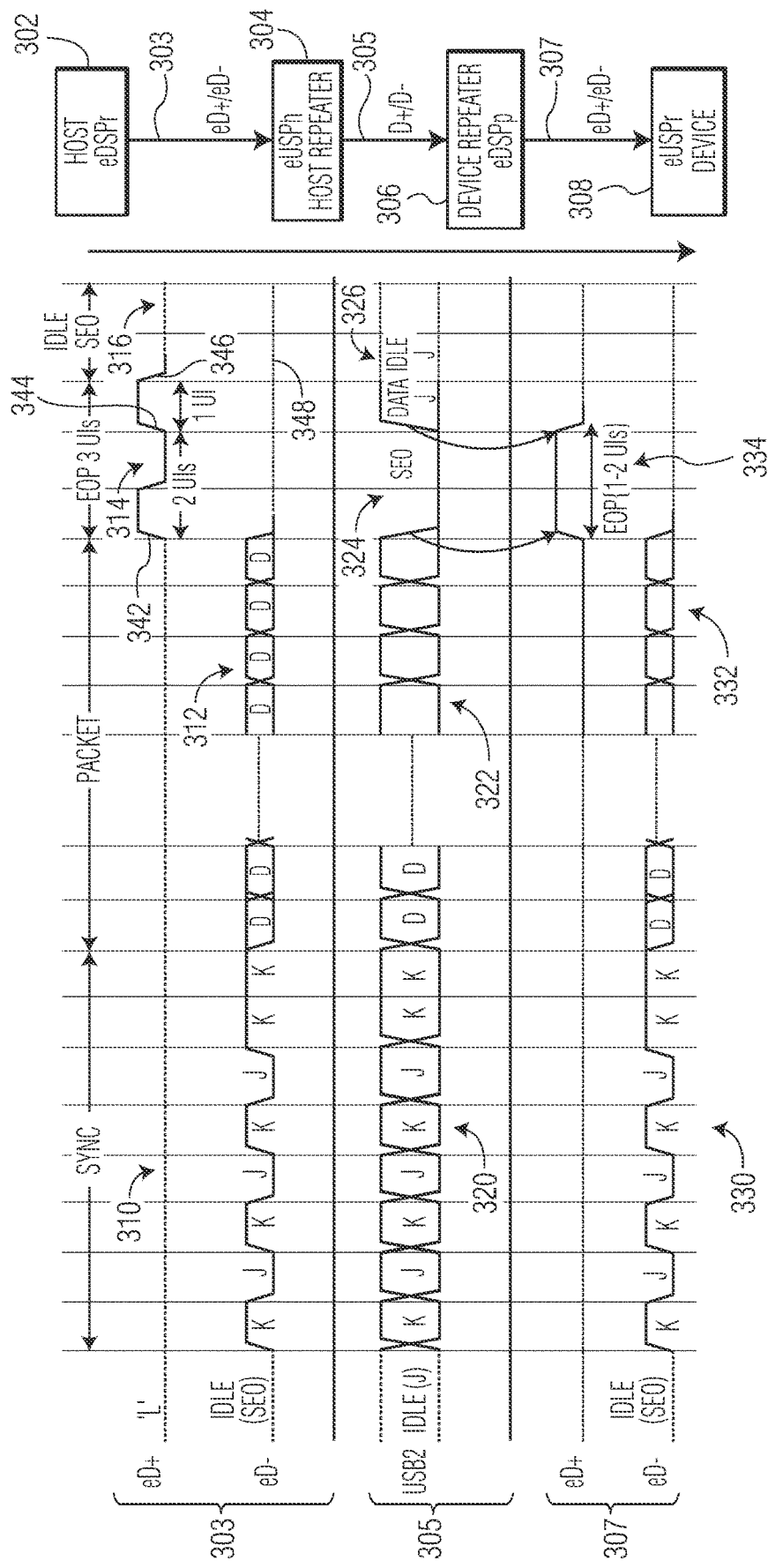
FIG. 3 is a signal timing diagram of a Full Speed packet being sent from an eUSB Host to an eUSB Device through a Host eUSB repeater and a Device eUSB repeater.

FIG. 3 is a signal timing diagram of a Full Speed packet being sent from an eUSB Host 302 to an eUSB Device 308 through a Host eUSB repeater 304 and a Device eUSB repeater 306. Full Speed mode, originally introduced with USB 1.1. is supported as a legacy mode in USB 2.0 and with a few changes from USB 1.1 in eUSB2. The top portion of the signal timing diagram shows the host side eUSB bus 303, between the eUSB Host 302 and the Host eUSB repeater 304. The middle portion of the signal timing diagram shows the USB bus between the Host eUSB repeater 304 and the Device eUSB repeater 306. The bottom portion of the signal timing diagram shows the device side eUSB bus 307 between the Device eUSB repeater 306 and the eUSB Device 308.

The Host 302 initiates a Full Speed packet on its eUSB bus 303. The packet from the eUSB Host 302 is shown on the top portion of the timing signal diagram. The majority of the packet is sent on the eUSB bus eD− signal. The packet starts with the typical USB packet SYNC pattern 310, KJKJKJKK, and then is followed by the normal packet data 312. The packet ends with an End of Packet (EOP) pattern 314, toggling on the eUSB bus eD+ signal.

The middle portion of the timing signal diagram of FIG. 3 shows how the Full Speed packet from the eUSB Host 302 gets translated by the Host eUSB Repeater 304 and generated onto the USB bus 305. The Host eUSB repeater 304 first translates the single-ended signaling on eD− to differential signaling on USB. This happens to translate the SYNC pattern 320 and to translate the packet data 322. When the EOP pattern 314 occurs on the host side eUSB eD+ signal, the eUSB Repeater converts that to a USB formatted EOP for the USB bus. The first rising edge on eD+ 342 causes the eUSB repeater to drive an SE0 324 signal (Single-Ended Zero) on the differential lines in which the signal on both lines of the USB bus 305 are low. The second rising edge on eD+ 344 causes the eUSB Repeater to drive the USB bus 305 to a differential data J state 326. The last falling edge on eD+ 346 then causes the eUSB Repeater to tristate the USB bus and let the USB pullup and pulldown resistors hold the bus in an Idle J state. The SE0 condition provides a time gap between data packets.

For a digital data line with two voltage states, high and low, a tristate is a third state for which the line is set to a high impedance (high Z) with no particular applied voltage. As a result, any other device connected to the line is able to control the state of the line.

The Device eUSB repeater 306 translates the signals on the USB bus 305 into eUSB single-ended signaling as shown on the bottom section of the timing signal diagram. The SYNC pattern 320 on USB bus 305 causes the Device eUSB repeater 306 to drive the device side eUSB eD− line with the SYNC pattern 330. The packet data 322 on the USB bus 305 is translated as a data pattern 332 on the eUSB eD− line. The EOP on the USB bus 305 which is an SE0 324 followed by data J and idle J causes the Device eUSB repeater 306 to drive the eUSB eD+ line high to generate an EOP signal 334 during the USB bus SE0 324 and then low afterwards.

USB Full Speed packets are also sent from the eUSB Device 308 to the eUSB Host 302 through the Device eUSB repeater 306 and the Host eUSB repeater 304. The packet and EOP signals from the eUSB Device 308 are the same as those from the eUSB Host 302 and translated through the repeaters in the same way but in the opposite direction. These signals are defined in the eUSB2 Specification and there is a reciprocity that applies to signals so that they are the same regardless of direction.

While FIG. 3 shows USB Full Speed mode packets in eUSB, USB Low Speed mode is also supported and may be used for packets from the Host to the Device and vice versa. In Low Speed mode the eUSB signals are swapped from how they are sent during Full Speed mode. Instead of using eD− on the single-ended line, it is eD+ which carries the SYNC signal and the packet data. Instead of eD+, it is eD− which carries the packet's EOP signals. Otherwise, the repeaters perform the same functions. The differential signals of the USB signal are the same except with reversed polarity. For example, a Full Speed J is transmitted as D+ being high while D− is low. A Low Speed J is transmitted as D− being high while D− is low. In repeater mode, also referred to as transparent mode, the repeaters facilitate the passing of packets from each bus to the other bus, converting the single-ended signals to differential signals and vice versa as shown in FIG. 3. At an eUSB Repeater, if eD+ rises before eD−, then this indicates the start of a Low Speed mode packet. If eD− rises before eD+, then this indicates the start of a Full Speed mode packet.

On the USB bus 305, there is a string of transitions during the SYNC pattern 320 and the packet data 322. At any of the data bit transitions on the USB bus 305 from J to K or K to J, there may be a period of time during which both lines are low before finally transitioning to the next bit state. This low state is referred to as SE0 (Single-Ended Zero). Instead of a clean J to K transition, the USB bus 305 may, for example, transition from J to SE0 and then from SE0 to K. This SE0 period is supposed to be less than 14 ns for USB Full Speed mode timing and less than 210 ns for USB Low Speed mode timing. An eUSB Repeater 304, 306 translating the packet from USB to eUSB filters out the temporary SE0 conditions.

In operation, for incoming eUSB packets, the repeater will look for the start of a packet as the presence of the first SYNC bit of the SYNC pattern and enable the other side of the eUSB repeater, the USB2 full speed driver, to pass the incoming packet from eUSB to USB2. The drivers will then pass the SYNC bits and packet data carried on the eUSB data line (eD− for full speed mode and eD+ for low speed mode) to the USB2 bus. Once the end of the packet arrives on the eUSB control line (eD+ for full speed mode and eD− for low speed mode), then the repeater will use the first portion of the EOP (high going pulse on eUSB control line followed by low period) to drive an SE0 on the USB2 bus. The repeater then uses the end of the EOP (second high going pulse on eUSB control line) to drive the USB2 bus to a data J condition before releasing the bus.

In the reverse direction from USB2 to eUSB. The repeater uses the same strategy to pass packets from USB2 to eUSB converting from differential signaling to single ended signaling. First the USB2 SYNC bit is detected at the start of the incoming USB2 packet then the eUSB data line is enabled to convert the differential SYNC bits and packet data bits from USB2 to single ended signaling on the eUSB data line. When the SE0 of the EOP is received on the USB2 bus, the eUSB control line can be driven high. Lastly when the EOP ends on the USB2 side, the eUSB lines may be released.

Figure 4:
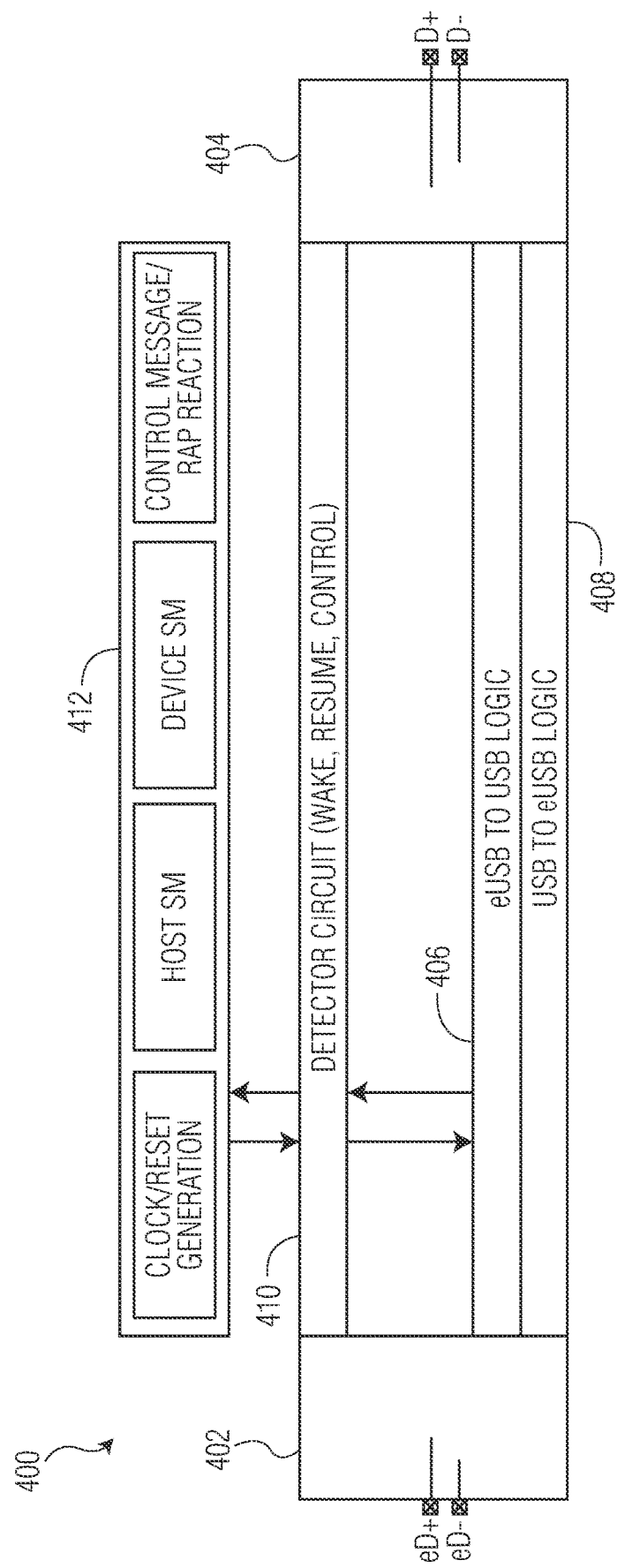
FIG. 4 is a block diagram of a repeater, for example any single-ended to differential repeater or any eUSB repeater with a detector circuit

FIG. 4 is a block diagram of a repeater 400, for example any single-ended to differential repeater or any eUSB to USB repeater with a detector circuit. The repeater 400 has an analog single-ended transceiver 402 to generate an internal data signal based on received data signals from the single-ended bus. The receiver portion of the single-ended transceiver has a dp single-ended receiver output driver to generate a received dp signal and a dm single-ended receiver output driver to generate a received dm signal. In repeater mode, the dp and dm signals are provided to repeating mode logic, e.g., eUSB to USB Logic 406 as internal data signals to an analog differential transceiver 404. The internal data signals carry the data, EOP and SE0 information as described above. The internal data signals are coupled to a transmitter output driver of the analog differential transceiver 404. The transmitter output driver drives a differential data signal to the differential bus, such as the D+/D− lines of the USB bus as shown.

The analog differential transceiver 404 also has a dp single-ended receiver output driver to generate a received dp signal and a dm single-ended receiver output driver to generate a received dm signal. Both of these signals are provided as internal data signals to repeating mode logic, e.g., USB to eUSB Logic 408 which provides, in response, the internal data signals to the analog single-ended transceiver 402. The dp and dm signals are data and enable signals for single-ended transmitter output drivers. The transmitter portion of the analog single-ended transceiver 402 drives a single-ended data signal to the single-ended data bus, such as the eD+/eD− lines of the eUSB bus as described above.

The eUSB to USB Logic 406 and the USB to eUSB Logic 408 together form the repeater logic coupled to the analog differential transceiver and the analog single-ended transceiver to repeat data signals between the differential data bus and the single-ended data bus. The eUSB to USB Logic 406 and the USB to eUSB Logic 408 are also both coupled to high level logic 412. The high level logic 412 may include logic to handle non-repeating mode operations such as clock/reset generation, Host state machine (SM), Device SM, control message handling and register access protocol (RAP) reception. The control functions may include circuit startup, connection, suspend, resume, wake, bus reset, port reset detection, etc.

The signals at the analog single-ended transceiver 402 and at the analog differential transceiver 404 are monitored by a detector circuit 410. The detector circuit 410 is coupled to the other components, e.g., the eUSB to USB Logic 406, the USB to eUSB Logic 408, and the high level logic 412, to be set to an active state when other components are set to a standby, suspend, or other low power state. The detector circuit 410 is coupled to the analog single-ended transceiver 402 and is coupled to the analog differential transceiver 404 to receive signaling on each bus and then to wake or resume the repeater logic in response. The detector circuit may wake the eUSB to USB Logic 406 of the repeater logic, the USB to eUSB logic 408 of the repeater logic or both or other components (not shown) of the repeater 400 including the high level logic 412.

The eUSB2 Specification specifies a few activities that may occur while a repeater is in one of the low power states, e.g., L1, or L2 suspend. A repeater may receive an eUSB Control Message during this time. This could be used to change the power level between L2, the lowest power level with the slowest exit time, and L1, a higher power level with a faster exit time. This could be used to request that the host side eUSB repeater issue a USB Bus Reset, etc. A host side eUSB repeater may receive a Start of Resume (SOR) from an eUSB Host to cause the repeater to send resume signaling down to the USB device. A device side eUSB repeater may receive a Start of Wake (SOW) from an eUSB Device to cause the device side eUSB repeater to send the wake up to the host. A host side eUSB repeater, if present, receives the wake and then sends the wake from the host side eUSB repeater to the eUSB Host. Other control messages may be added or used to suit particular implementations.

Figure 5:
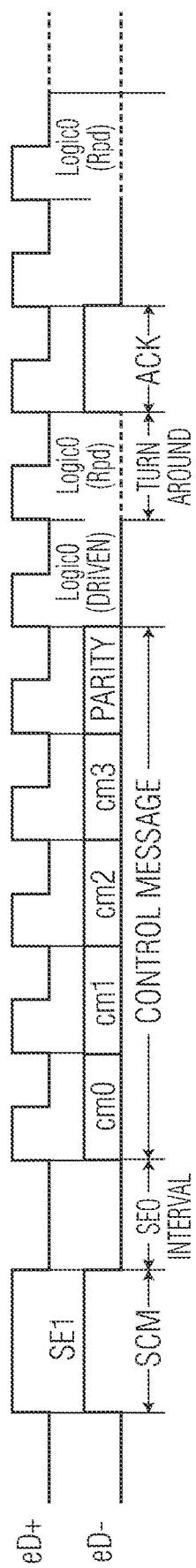
FIG. 5 is a timing diagram of a Start of Control Message (SCM) signal as defined in the eUSB2 Specification.

FIG. 5 is a timing diagram of an eUSB start of control message (SCM) as defined in the eUSB2 Specification. The control message is driven on the two single-ended lines, eD+/eD− of the eUSB bus. The control message begins with a period of time during which both eUSB lines are driven high. This is called "SE1" for Single Ended "1." It is also called the Start of Control Message (SCM). Next is a period of time during which both lines are driven low. This is called "SE0" for Single Ended "0." The control message follows with eD+ acting as a clock and eD− carrying the data for the control message. The SCM has a duration anywhere from 333 ns to about 2.6 us. The duration of the SE0 is 333 ns long. After the control message, the data line eD− is driven low to a Logic 0 and then released to a low state, e.g., with pull-down resistors (Rpd). An acknowledgement (ACK) may be received on the other end and the line is then released again to a "0" state.

The actual reception of the control message lends itself to using the eUSB eD+ line as a clock and the eD− line as data and simply capturing the incoming data with the falling edge of the clock. Of course, there are other possibilities for receiving the control message. An internal clock could be used to oversample the signals and process the control message that way. This would require a faster clock and lead to higher power consumption.

Figure 6:
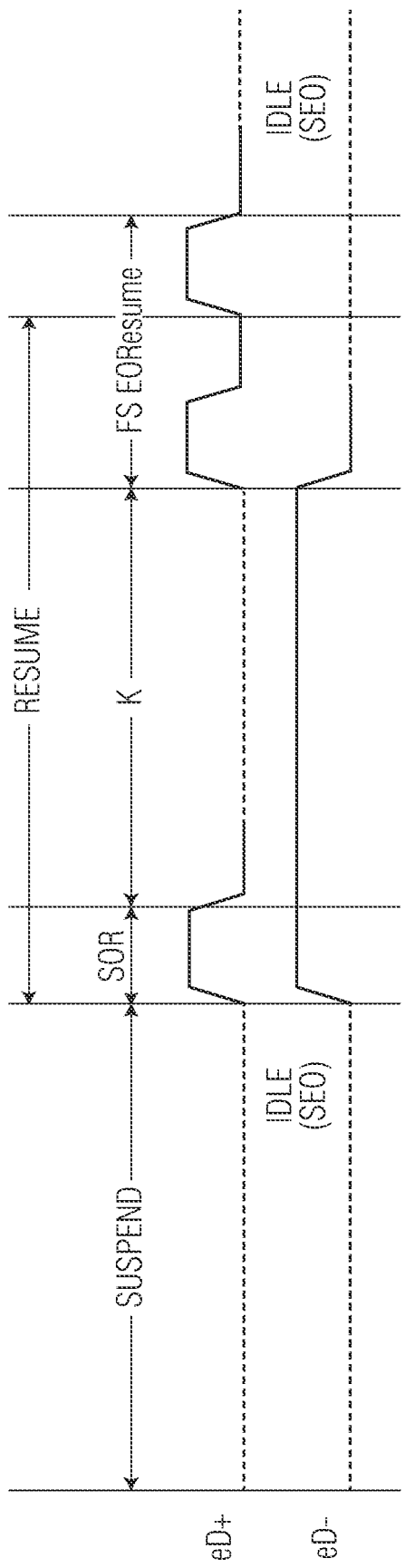
FIG. 6 is a timing diagram of a Start of Resume (SOR) signal as defined in the eUSB2 Specification.

FIG. 6 is a timing diagram of a Start of Resume (SOR) signal as defined in the eUSB2 Specification. Initially, the eUSB bus is in an SE0 with both lines held low. This may be done with pull-down resistors or in another way. The eUSB FS mode SOR starts with both eUSB lines being driven high as SE1 followed by eD+ going low and eD− staying high. This period is called an eUSB K and has a duration of several milliseconds. When the host wishes to end the resume, it does so by driving eD− low and pulses eD+ high two times. The lines then return to an SE0 idle state.

The USB Low Speed (LS) mode SOR followed by resume is the same as that for FS mode except that the role of eD+ and eD− are reversed. eD+ stays high and eD− goes low after the initial SE1. An eUSB High Speed (HS) mode SOR is the same as for the FS Mode except that the EOR is a single pulse on the eD+ line of the eUSB rather than 2 pulses.

Figure 7:
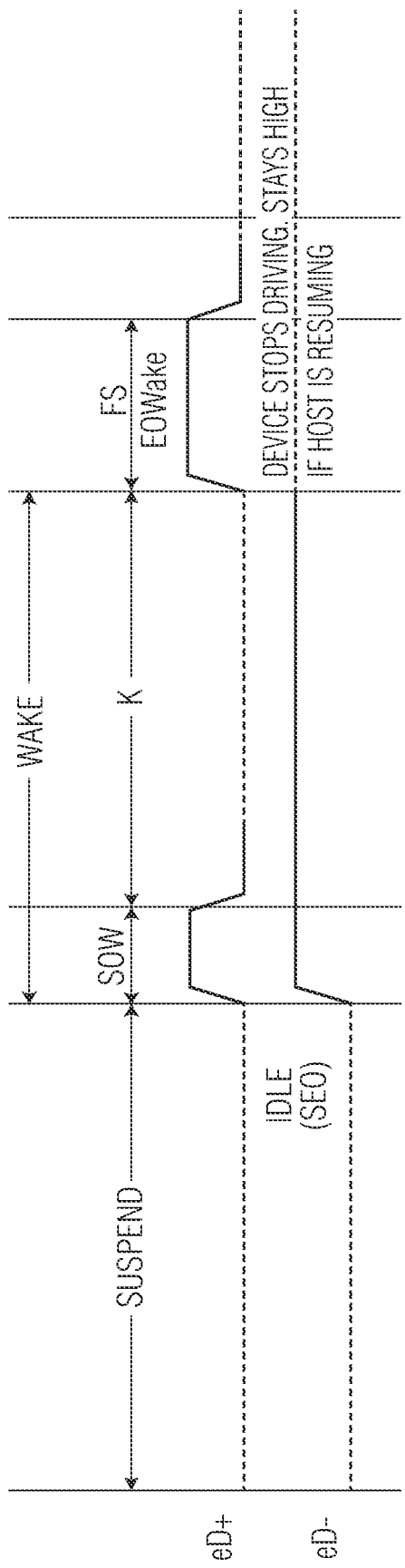
FIG. 7 is a timing diagram of a Start of Wake (SOW) signal as defined in the eUSB2 Specification in Full Speed Mode.

FIG. 7 is a timing diagram of a Start of Wake (SOW) signal as defined in the eUSB2 Specification in Full Speed Mode. Initially, the eUSB bus is in an SE0 with both lines held low. This may be done with pull-down resistors or in another way. The USB FS mode SOW starts with both eUSB lines being driven high (SE1) followed by eD+ going low and eD− staying high. This period is called a USB K that lasts for several milliseconds and is the start of the wake signal. The device ends the wake signal by tri-stating eD− and pulsing eD+ high. The lines then return to an SE0 idle state.

The USB Low Speed Mode SOW followed by wake is the same as that for FS mode except that the role of the eUSB lines eD+/eD− are reversed. A High Speed Mode SOW is the same as the Full Speed Mode SOW.

As shown, the SOR and the SOW have the same signals. The difference is that the SOR is monitored for by the host side eUSB repeaters while the SOW is monitored by the device side eUSB repeaters. Accordingly, both the host side and the device side eUSB repeaters can detect and receive a wake signal can both be handled using the same circuitry. While the present description refers to an SOR and SOR section, the same description applies also to SOW.

FIGS. 8A to 8D are diagrams of a detector circuit 800 suitable for detecting start conditions on the eUSB bus using very low power and then waking other higher power circuitry. The detector circuit 800 may be placed in a suspend mode. The suspend modes may include logic reset, low power, or sleep mode when the higher power circuitry is active and in other conditions that may generate signals that are like an SCM or SOR but are not. High level logic 864 may also generate a reset signal, labeled as the reset_n signal. The high level logic 864 sends the reset signal to a latch to generate a rst_lowpower_clk_n signal, as appropriate and sends the reset signal to state elements of the detector circuit 800. The reset may be used to reset all of the flops of the detector circuit 800 described below.

In part, false detection may be avoided by determining whether the higher power circuitry is driving signals on the eUSB bus. A driving_eusb_bus signal is shown as an example for this purpose. The repeater is driving signals on one or both the eUSB bus and the USB bus when it is in the active state. This driving_eusb_bus signal may be used as another reset signal to place or set the detection circuit in the suspend mode or a standby or low power state when the repeater logic is placed or set in the active state. The host and device state machines 830 include components of the repeater logic so that an eUSB transmit enable signal, both for edp and for edm, is an internal signal of USB to eUSB logic of an eUSB repeater.

A transmit enable signal of the host repeater such as the eusb_tx_dp_en_host signal or the eusb_tx_dm_en_host signal indicates that one or both of the edp and edm output drivers of the host repeater's eUSB transmitter are active. Similarly, a transmit enable signal of the device repeater such as the eusb_tx_dp_en_device signal or the eusb_tx_dm_en_device signal indicates that one or both of the edp and edm output drivers of the device repeater's eUSB transmitter are active. With the repeater logic active, there is no need to detect a wake signal at the detector circuit 800 and the detector circuit 800 can be made inactive or even suspended. The SCM detection does not have to be disabled when the repeater is in the active state. It may remain on to help sense the start of control messages.

The detector circuit 800 when it is set in an active state allows the other components to remain set in a low power state longer and rely on the detector circuit to provide a fast wake or resume upon receiving a wake signal for the various messages. The detector circuit is configured to properly detect the SCM portion of the control message and then wake the high level logic. The start of resume (SOR) signal is very long and yet easier to detect in time. The start of wake (SOW) signal is also very long. The detector circuit is configured to detect these and wake the repeater out of a lower power mode to handle the subsequent host resume or device wake conditions.

Referring to FIG. 8A, the detector circuit 800 has a positive section 802 (pos) and a negative section 804 (neg) of the detector circuit 800. Referring to FIG. 8C, the positive section 802 has a sync circuit 806 with a first state element, e.g., a first sync flop 808 and second state element, e.g., a second sync flop 810. Both the first sync flop 808 and the second sync flop 810 are connected to a clock 822 at their respective sync or clock input. The clock 822 may be a unique low power clock for the detector circuit 800 that operates at a slower clock frequency than the repeater to which the detector circuit 800 is connected. The first sync flop 808 is coupled to the analog eUSB bus through the two bus lines from an analog eUSB circuit 820 that have the eD+ and eD− signals, the eusb_rxdp signal and the eusb_rxdm signal. A line or trace may be used to tap into the bus as it connects to the repeater or the analog eUSB circuit 820 may have dedicated drivers and output port to connect to the detector circuit 800. The first sync flop 808 is triggered by the falling edge of the clock 822. The second sync flop 810 of the positive section 802 is coupled to the analog eUSB bus through the first sync flop 808 and is triggered to detect a signal on the rising edge of the clock 822. The second sync flop 810 is also coupled to the clock 822 at its clock input to detect a signal on the falling edge of the flop. The second sync flop 810 is coupled to the first sync flop 808 to capture the state of the first sync flop on the falling edge of the clock.

A negative section 804 of the detector circuit 800 has a sync circuit 812 that is coupled to the same eUSB bus to receive the eusb_rxdp signal and the eusb_rxdm signal from the analog eUSB circuit 820 and to the same clock 822 but uses the opposite synchronization configuration so that a first sync flop 814 detects a signal on the rising edge of the clock 822 and the second sync flop 816 detects a signal the falling edge of the clock 822. The first sync flop 814 of the negative section 804 of the of the sync circuit 812 is coupled to the analog eUSB bus and the second sync flop 816 is coupled to the eUSB bus through the first sync flop 814. The second sync flop 816 is coupled to the first sync flop to capture the state of the first sync flop 814 on a rising edge of the clock Using the positive section 802 and the negative section on opposite edges of the clock allows the detection function to operate at twice the clock rate. The circuit is able to detect a signal at two different times in one clock pulse. This allows the second clock of the detector circuit to be half the speed of the first clock of the repeater without missing any signals. The clock may be still slower than half of the first clock because the wake signals are longer than a single repeater clock. The slower clock reduces the power consumption of the detector circuit which may be important because the detector circuit may be powered whenever the repeater is not active.

The first sync flop 808 and the second sync flop 810 are two stages of state elements to capture the state of the eUSB eD+ and eD− signals once for each pulse of the clock 822. The clock 822 may be lower power by being lower frequency using the two stages. By using synchronizers in which the first stage uses a different edge of the clock than the second stage, the synchronization process operates at twice the clock frequency. Also, by splitting the synchronization into two stages using different clock edges, the total time to synchronize the input is reduced. If the eUSB input signal changes state just after a clock edge, then it will be caught shortly afterward by the other sync flop at the next clock edge.

Figure 8B:
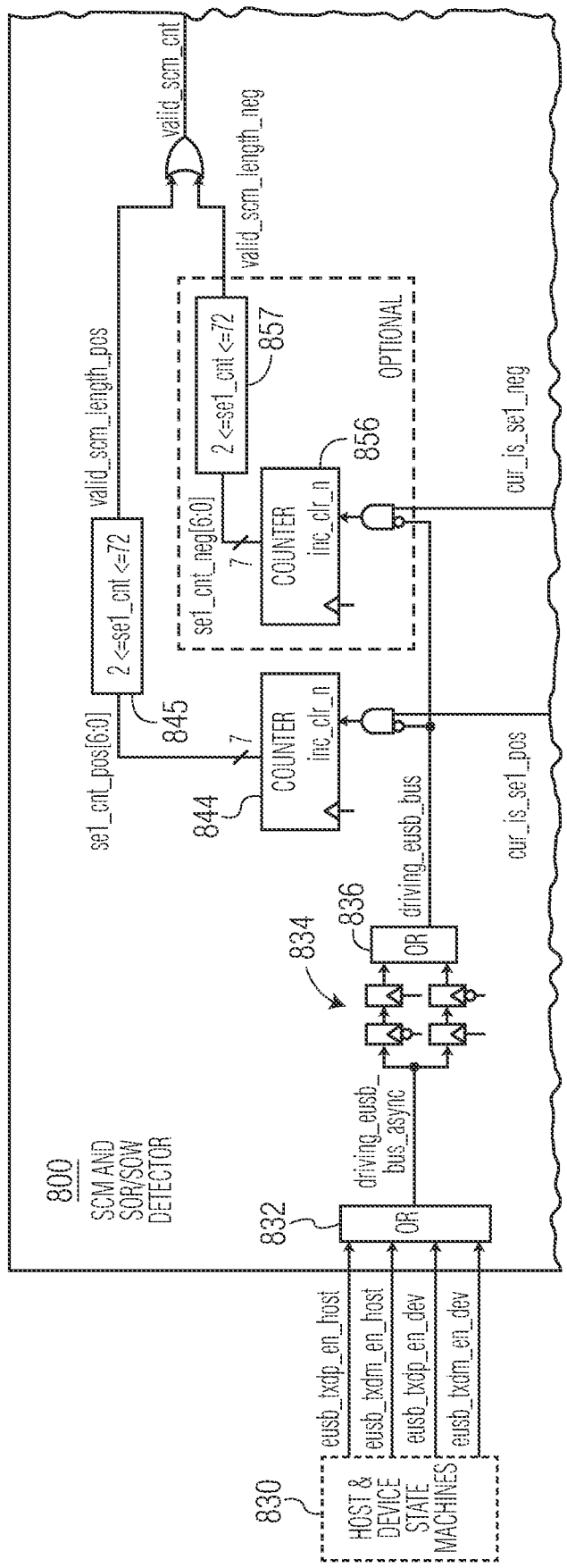
Figure 8C:
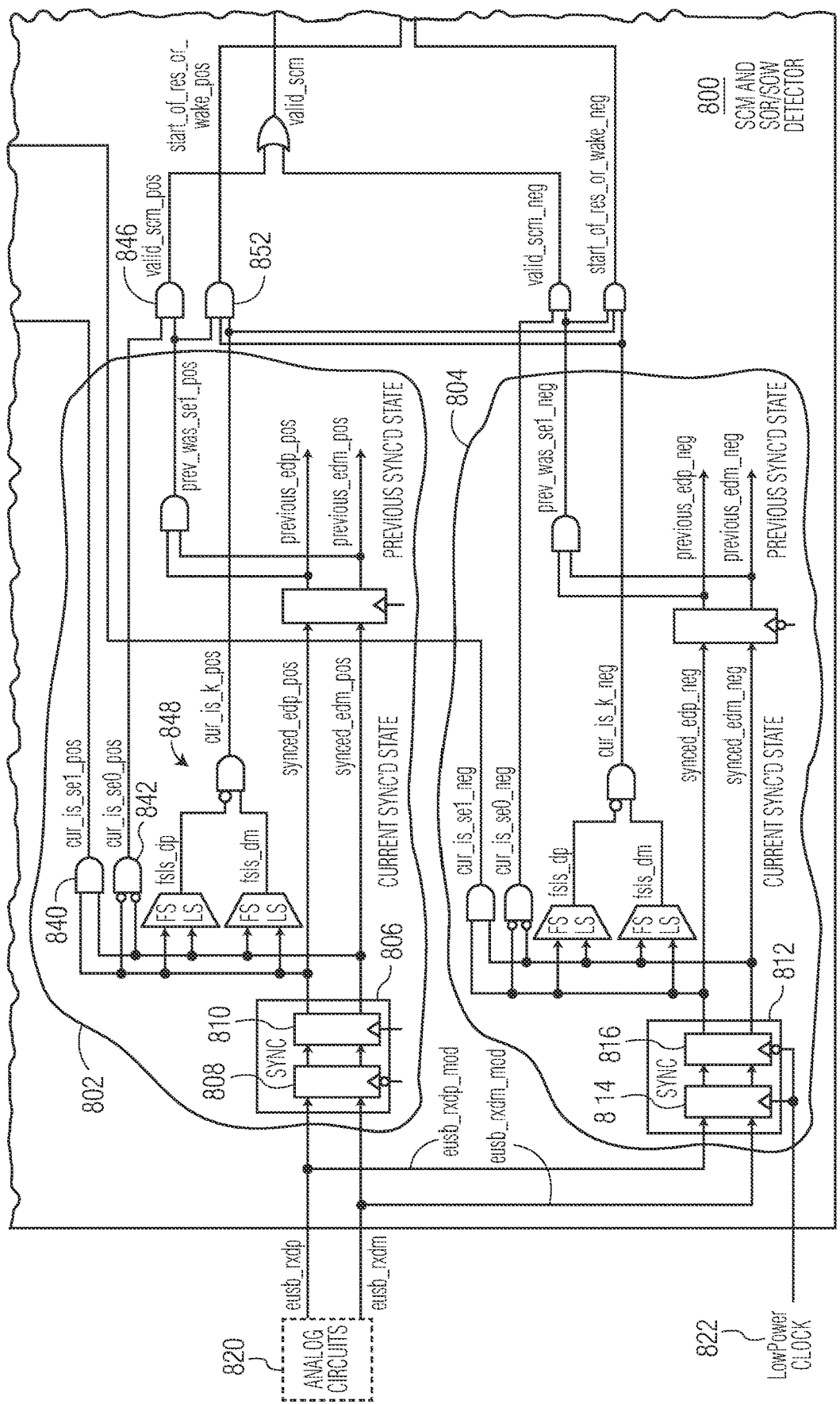

Referring to FIG. 8B, a similar double two-stage structure is used with the enable signals. State machines 830 of the host and the device generate various transmit enable signals. In this example, for the eUSB bus, there are positive and negative enable signals for the host and for the device. These signals are labeled as the eusb_txdp_en_host signal for the positive, eD+, enable signal for the host. The eusb_txdm_en_host signal is the minus, eD−, enable signal for the host. The eusb_txdp_en_dev signal is the positive, eD+, enable signal for the device, and the eusb_txdm_en_dev signal is the minus, eD−, enable signal for the device. Two of the four signals, either the host signal for a host eUSB repeater or the device signals for a device eUSB repeater, are applied to an OR gate that produces a high when any of the two signals is high. The output is labeled as the driving_eusb_bus_async signal. This signal is applied to the enable detector 834 which has two two-stage sync sections. Using a flop pair for each section, a negative section and a positive section, and a flop for each stage of each section, a transition in the enable signals is detected quickly. The output of each section is applied to another OR gate 836 to generate a single driving_eusb_bus signal. This will be high whenever the repeater is driving a signal on the eUSB bus.

Returning to the positive section 802 of the detector circuit 800 as shown in FIG. 8C, the output of the sync circuit 806 is coupled to several gates. A first output of the sync circuit is the synced positive eD+ signal labeled as the synced_edp_pos signal which indicates that a signal has been detected on the eD+ line. A second output of the sync circuit is the synced minus eD− signal labeled as the synced_edm_pos signal which indicates that a signal has been detected on the eD− line in the positive section 802. The two signals, the synced_edp_pos signal and the synced_edm_pos signal may be compared to determine whether the current state of the eUSB bus is SE1, SE0 or K.

The signals are applied to a first AND gate 840. If both signals are high, then an SE1 state is likely. A cur_is_se1_pos signal is generated for the current SE1 state and applied to a positive counter 844 to determine if the SE1 state persists. The signals are applied to a second AND gate 842 with inverters at its inputs. If both signals are low, then an SE0 state is likely. A cur_is_se0_pos signal is generated for the current SE0 state and compared to a previous state of the eUSB bus at an AND gate 846 that is stored in the positive section 802. If the previous state was SE1 based on the prev_was_se1_pos signal, then a valid SCM is declared to the SCM section 850 as the valid_scm signal. The synchronized eD+/eD− status generated by the positive sync circuit 806 and the negative sync circuit 812 is used to create a previous synchronized state for the eUSB bus in respective storage flops. This previous synchronized state is used to generate the prev_was_se1_pos signal and the prev_was_se1_neg signal.

A K detector 848 has a third set of logic gates. These gates are configured for FS or LS using, for example, the fsls_mode_signal. The gates then compare the eD+ signal to the eD− signal. If the appropriate one is high and the other is low for the current mode then a cur_is_k_pos signal is produced. The cur_is_k_pos signal is compared to the previous stored state at an AND gate 852. If the prior stored state was an SE1 state as indicated by the prev_was_se1_pos signal, then a start_of_res_or_wake_pos signal is generated and coupled to an SOR section 854. In this case, the detector circuit 800 has determined that the eUSB bus has likely transitioned from SE1 to K. The detector circuit has detected a start signal, the start_of_res_or_wake_pos signal. This indicates that the repeater system should resume or wake. Upon detecting this start signal, the start_of_res_or_wake_pos signal is applied to SOR section 854. In this example, the start_of_res_or_wake_pos signal is applied to a set/reset flip-flop that generates a wake signal, the start_of_res_or_wake_latched signal, to the repeater logic, the host and device state machines 862. After the host and device state machines are active, then either or both, as appropriate can send a clr_sor_sow signal to the SOR section to clear the wake signal by clearing the set/reset flip-flop. The clr_sor_sow signal may be generated when the host or device clocks are running and the host or device has detected the SOR or SOW directly.

An SOR signal, i.e., a Start of Resume or a Start of Wake signal has a current synchronized eD+/eD− state of K and a previous synchronized eD+/eD− state of SE1. The skew on the eUSB bus can cause the transition at the end of an SCM to also look like an SE1 to K and then to SE0. This error may be avoided in many instances by using the current synchronized value from the cur_is_k_pos signal from the positive section 802 and also the cur_is_k_neg signal from the negative section 804 together and requiring both before sending the SOR signal to the SOR section 854.

The AND gate 852 receives both the cur_is_k_pos signal and the cur_is_k_neg signal. Using both K signals provides filtering to protect against catching a false K due to the skew between the two lines eD+/eD− on the eUSB bus. The AND gate generates a start_of_res_or_wake_pos signal that is applied to an OR gate of the SOR section 854 shown in FIG. 8D. The negative section 804 has a similar AND gate that receives both K signals and the prev_was_se1_neg signal. The AND gate then generates a start_of_res_or_wake_neg signal. The two outputs are applied to an OR gate so that if either the positive section 802 or the negative section detects the stat signal, the start_of_res_or_wake_raw signal is applied to the latch of the SOR section 854.

Referring to FIG. 8C, the negative section 804 has a parallel set of logic gates to generate a cur_is_se1_neg signal, a cur_is_se0_neg signal and a cur_is_k_neg signal in the same way as in the positive section but using the synced output of the negative two stage sync circuit 812. The cur_is_se1_neg signal goes to a separate negative counter 856, shown in FIG. 8B. Also shown in FIG. 8B, the positive counter 844 and the negative counter 856 are driven by the clock 822 and start counting when the respective input signal goes high. The counters receive the signal transition to high in this example and continue to count for the duration of the respective signal. The count determines a duration of the signal, in this example SE1, after the signal transition to high and before a next signal transition to low. If the respective SE1 detection input signal goes low, then the counters stop counting. The counters count the duration of the signal when it is high. The count may be set to any suitable number to suit the signaling protocols of the input bus and the clock rate of the clock 822 at the input. Using a low power clock of 8 MHz and applying it to eUSB, as currently specified, a count of 72 may be used. If the determined duration of the signal as determined by the positive counter 844 reaches the predetermined counter value, e.g., 72, at a counter comparator 845 then a valid_scm_length_pos signal is sent to the SCM section 850, shown in FIG. 8D. If the determined duration of the signal at the negative counter 856 reaches the predetermined counter value, e.g., 72, at a counter comparator 857 for the negative counter then a valid_scm_length_neg signal is sent to the SCM section 850.

The positive counter 844 and the negative counter 856 increment every pulse of the clock 822 for which there is an SE1 (SE1 is true) at the input. It clears when there is no SE1 (SE1 is false). An SE1 is true only if both eD+ and eD− are high and the repeater is not driving either one. The counters are used to rule out an excessively long SE1 which will not be a possible SCM. By ensuring that the repeater is not driving the line using the driving_eusb_bus signal from the OR gate 836, some false SE1 are eliminated. One false SE1 condition is that the host or device is driving one line of the eUSB bus and the repeater is driving the other line of the eUSB bus.

Referring to FIG. 8B, using the counter comparators 845, 857, in one example the counting stops at 73. Any count over 72 is declared as invalid. The counter comparators 845, 847 allow for an SE1 as long as about 8 us-10 us to be considered to be an SCM signal. The choice of the counter threshold may be adapted to suit different protocols and different environments. According to the current eUSB Specification, a 1×SCM has a duration of 333 ns. An 8×SCM has a duration of 2.7 us. A hybrid repeater may receive SCM signals with a duration up to about 4 us. The maximum counter duration may be set to 4 us or higher to allow for further changes of the specified durations. A minimum count may also be used with the counter comparators 845, 857 to filter out a false SE1 condition caused by noise. The eUSB Specification states that a minimum duration for an SCM is 333 ns. An inexpensive low power clock operating at 8 MHz may have an accuracy of about 20% providing a minimum of 6.4 MHz. This corresponds to a period, or clock pulse duration, of 156.3 ns. Two clock periods, corresponding to 312.5 ns will be sufficient to detect this minimum specified SE1 duration. Other numbers of pulses may be used for other clocks and other signal durations.

Figure 8D:
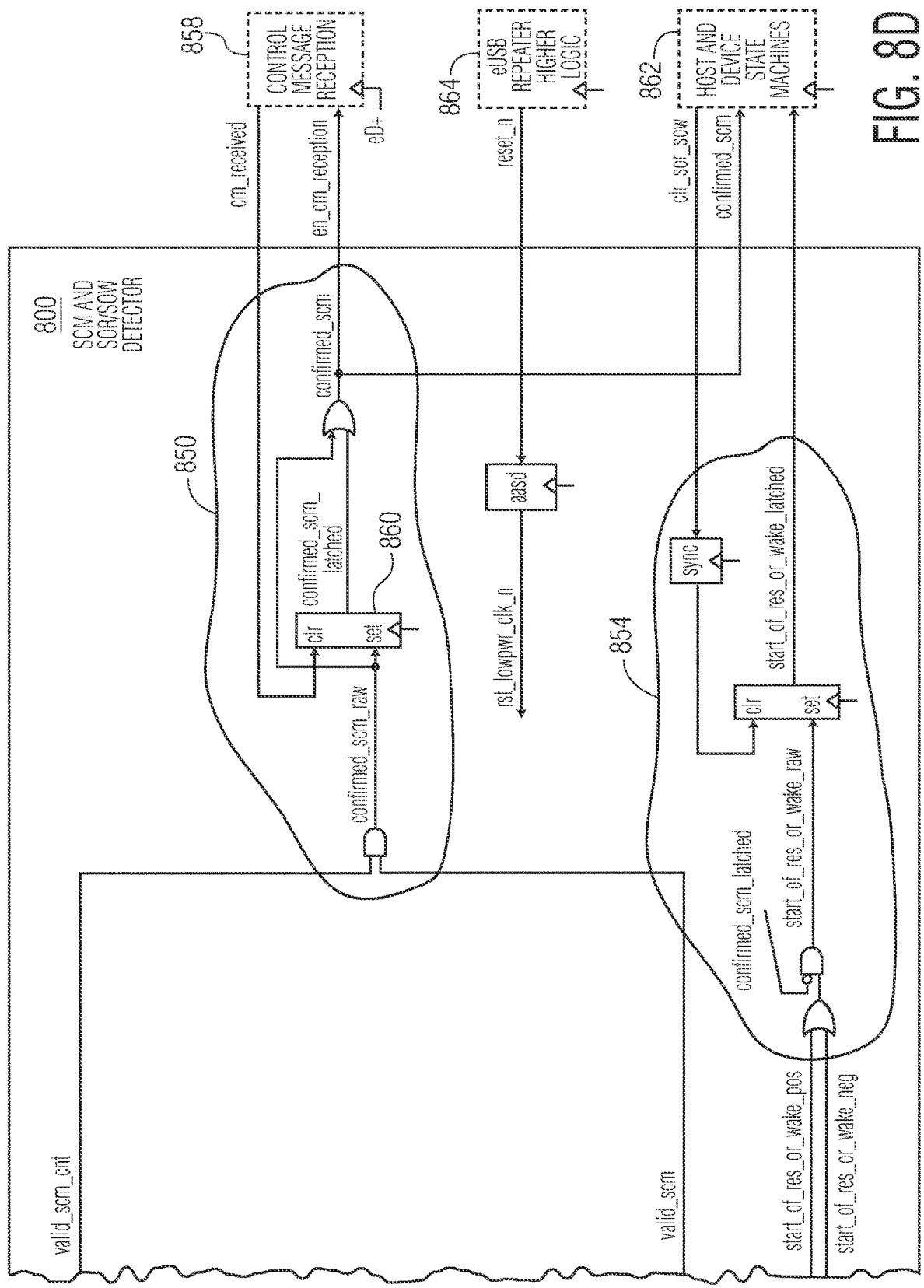

Referring to FIG. 8D, the SCM section 850 tests these signals against a valid_scm signal. If both are true then a confirmed_scm signal is sent to the control message reception 858 of the high level logic. The confirmed_scm signal wakes the high level logic and the high level logic then configures any needed hardware to receive any control messages from the analog eUSB circuits 820 on the eUSB bus. In the illustrated embodiment, the confirmed_scm signal is also coupled to the host and device state machines 862 to wake the repeater directly. The host and device state machines 862 then receive the signals on the eUSB bus for the control message reception 858. According to the eUSB specification, the SE1 is ended on the eUSB bus for the control message to be sent. For the illustrated circuit, ending the SE1, ends the valid_scm signal. In some examples a state element, such as an SCM flop 860 is coupled between the confirmed_scm_raw signal and the control message reception 858. The SCM flop 860 maintains the confirmed_scm signal as a confirmed_scm_latched signal until the SCM flop 860 is cleared by the control message reception 858 using the cm_received signal. This clears the confirmed_scm_latched signal so that if the confirmed_scm_raw signal has ended, then the confirmed_scm signal is also similarly no longer asserted. The SCM section 850 is then ready for the next SCM signal.

The valid_scm signal is generated when the cur_is_se0_pos signal is high from the AND gate 842 and the prev_was_se1_pos signal is also high or when the cur_is_se0_neg signal is high from a corresponding AND gate in the negative section 804 and the prev_was_se1_neg signal is also high. A valid SCM is one where the current synchronized eD+/eD− state is SE0 and the previous synchronized eD+/eD− state was SE1. Skew on the eUSB bus can cause the transition at the end of the SCM to look like SE1 to K to SE0. By using both the positive section 802 and the negative section 804 an SCM can be detected correctly notwithstanding the possible skew.

As mentioned above, the detection circuit detects a start signal, in this example the Start of Control Message (SCM) signal, using very little power with a slower clock and generates a wake signal to the repeater logic, by providing an indication that a valid SCM was received. This indication begins the wakeup operation for the repeater which is in the low power state upon receiving the wake signal to allow it to become fully operational again. This allows the control message to be processed even before the repeater wakes from this low power condition. The repeater can use the eD+ line as a clock reference and the eD− line as data while processing the incoming message. Therefore, this can be accomplished before the repeater's internal clock is available. The internal clock has time to initialize before the repeater takes action on the control message.

As mentioned above the two eUSB lines eD+/eD− may not rise and fall at the same time. In some implementations, there may be up to 600 ps of skew between the two lines. The skew may be in either direction with eD+ leading or eD− leading. The skew may also reverse between the rising and falling edges, such that, for example, eD+ leads at the start of the SCM (rises before eD−) and lags at the end of the SCM (falls after eD−). This skew accounted for in using the positive section 802 and the negative section 804 together. As a result, the end of the SCM is distinguished from other signaling such as SE1 followed not by an SE0 but by an eUSB K condition.

Figure 9:
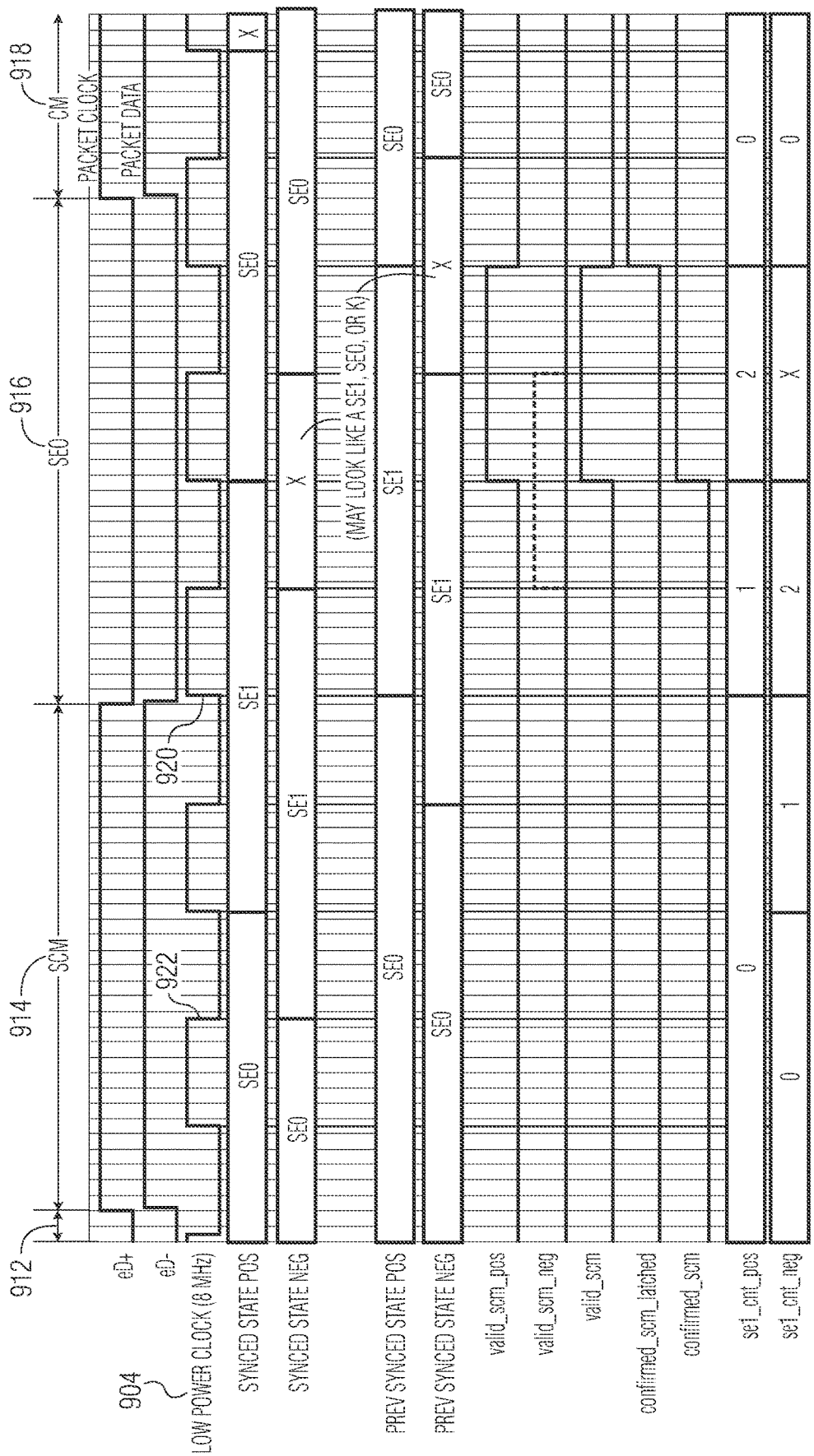
FIG. 9 is a timing diagram of the operation of a detector circuit using a low power clock in response to an incoming SCM.

FIG. 9 is a timing diagram of the operation of the detector circuit 800 using a low power 8 MHz clock 904 in response to an incoming SCM. As described above, the SCM starts from an idle SE0 912 that transitions to an SE1 914 and then to SE0 916 before the Control Message 918 begins. In this example scenario, there is no discernible skew between the input eD+ and eD− lines. This timing diagram shows the eUSB signals, the low power clock, the synchronized eUSB state for the positive and negative sections, the previous synchronized eUSB state for the positive and negative sections, the various signals to detect a valid SCM, the confirmed SCM status, and the SE1 counter values for the positive and the negative sections. In this example, the SCM and the SE0 have a duration of 330 ns. The synchronized state pos signals and the previous synchronized state pos are generated by a first sync flop or first stage of the positive section using the falling edge of the low power clock and the second sync flop or second stage of the positive section using the rising edge. The synchronized state neg signals and the previous synchronized state neg signals are generated by the first sync flop using the rising edge of the low power clock and the second sync flop using the falling edge.

The SCM is detected by transitioning from idle to a long SE1 to a long SE0. With this signaling preamble, the following data is known to be a control message. A shorter SE0 may signal the start of normal data traffic. The example timing of the received SCM relative to the rising and falling edges of the clock represents a worst case scenario in which the detection of the SCM takes the longest and enables the Control Message Reception Logic at the latest possible time. This gives the least amount of time to wake the high level logic.

In this case, a low power clock rising edge at time 920 is aligned roughly with the end of the SE1. This delays when the sync path with falling edge/rising edge flops, the synchronized state pos signal, can catch the SE1 to the last second. In this case, the sync path with the rising edge/falling edge flops, the synchronized state neg signal, will catch the SE1 in the middle of it at time 922 but miss the end of the SE1 due to the transition falling right where the first flop (rising edge) will clock the eUSB state. This means the "neg" path will either stay at SE1, catch a potential K, or catch the SE0. It is labeled as X for the "Synced State Neg." With this timing, the synchronized state neg signal path may not detect the SCM since it may not see an SE1 to SE0 transition. The timing for the valid_scm_neg signal with a dotted line shows an example if the synchronized state neg signal caught the transition to SE0.

Even if the synchronized state neg signal does not catch the transition as shown in the solid line, the synchronized state pos signal does detect the SCM. The synchronized state pos signal detects the SE0 and the previous synchronized state pos signal detects the previous SE1 causing a valid detection of the SCM. The confirmed_scm signal is then asserted. There is additional time margin before the control message 918 starts of about 50 ns. Control message reception logic is then able to awake before the clock and data timing start for the control message 918.

By using both the rising and falling edge to synchronize the eUSB signals and by using a positive section and a negative section that detect on opposing edges, the SCM detection is performed successfully even if the SCM is not well timed to the low power clock. As described above, one path uses a falling edge, rising edge combination and the other path uses a rising edge, falling edge combination. In this way at least one of the paths will catch the transition from SE1 to SE0 and vice versa.

Figure 10:
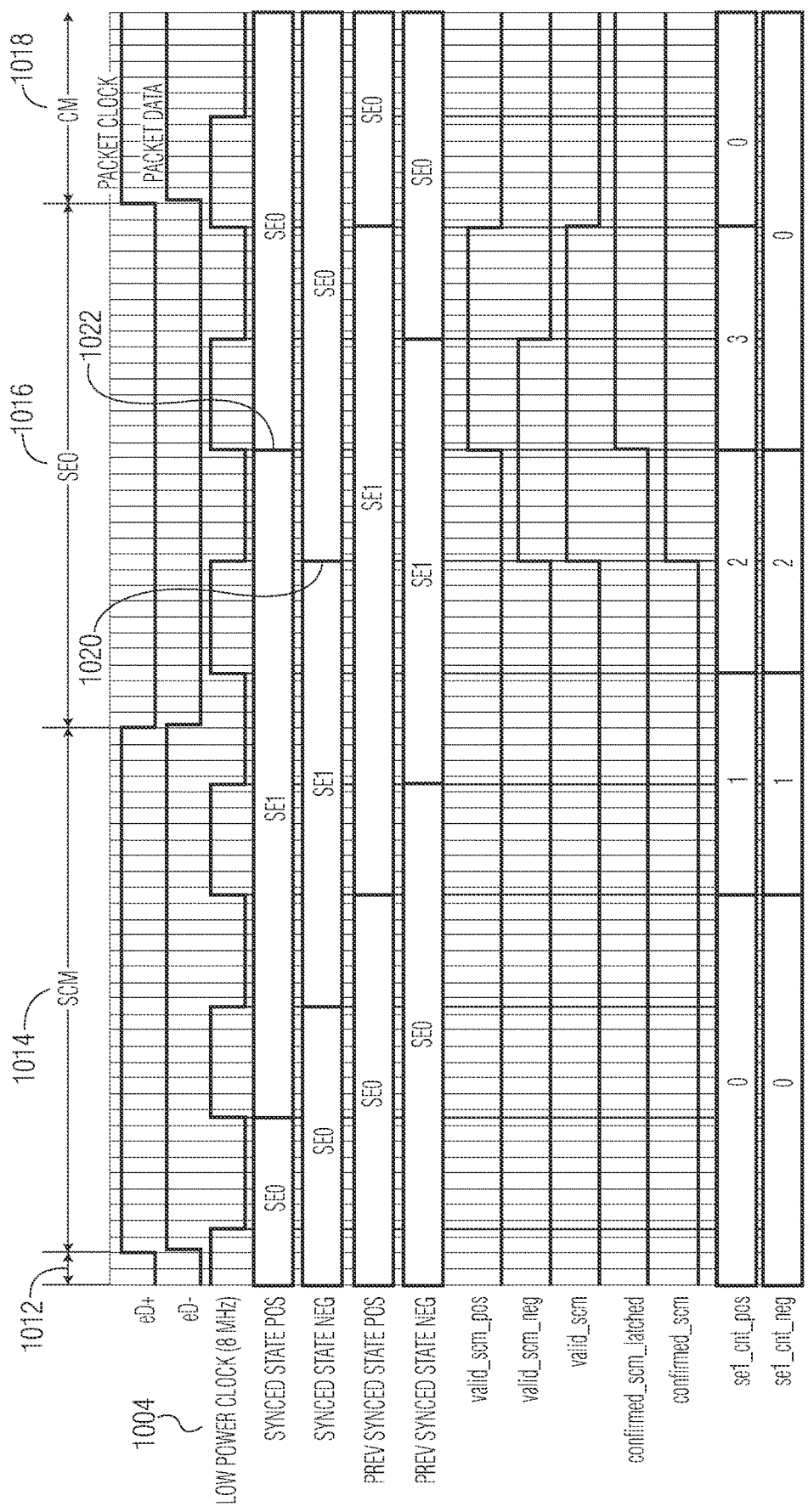
FIG. 10 is an alternative timing diagram of the operation of a detector circuit using a low power clock in response to an incoming SCM

FIG. 10 is a timing diagram of the operation of the detector circuit 800 using the same low power 8 MHz clock 1004 in response to an incoming SCM. The SCM starts again from an idle SE0 1012 that transitions to an SE1 1014 and then to SE0 1016 before the Control Message 1018 begins. This timing diagram shows the same signals except that the low power clock is shifted to the right as compared to the timing diagram of FIG. 9. As in FIG. 9, the synchronized state pos signal and the previous synchronized state pos signal are generated by a first sync flop or first stage of the positive section using the falling edge of the low power clock and the second sync flop or second stage of the positive section using the rising edge.

The shifted clock does not delay the detection of the SCM but advances the detection of the SCM. In this example, it is a combination of both the synchronized state pos signal and the synchronized state neg signal which detect the SCM. As shown, the synchronized state neg signal detects the SCM first at time 1020 followed a half clock later at time 1022 by the synchronized state pos signal.

Figure 11:
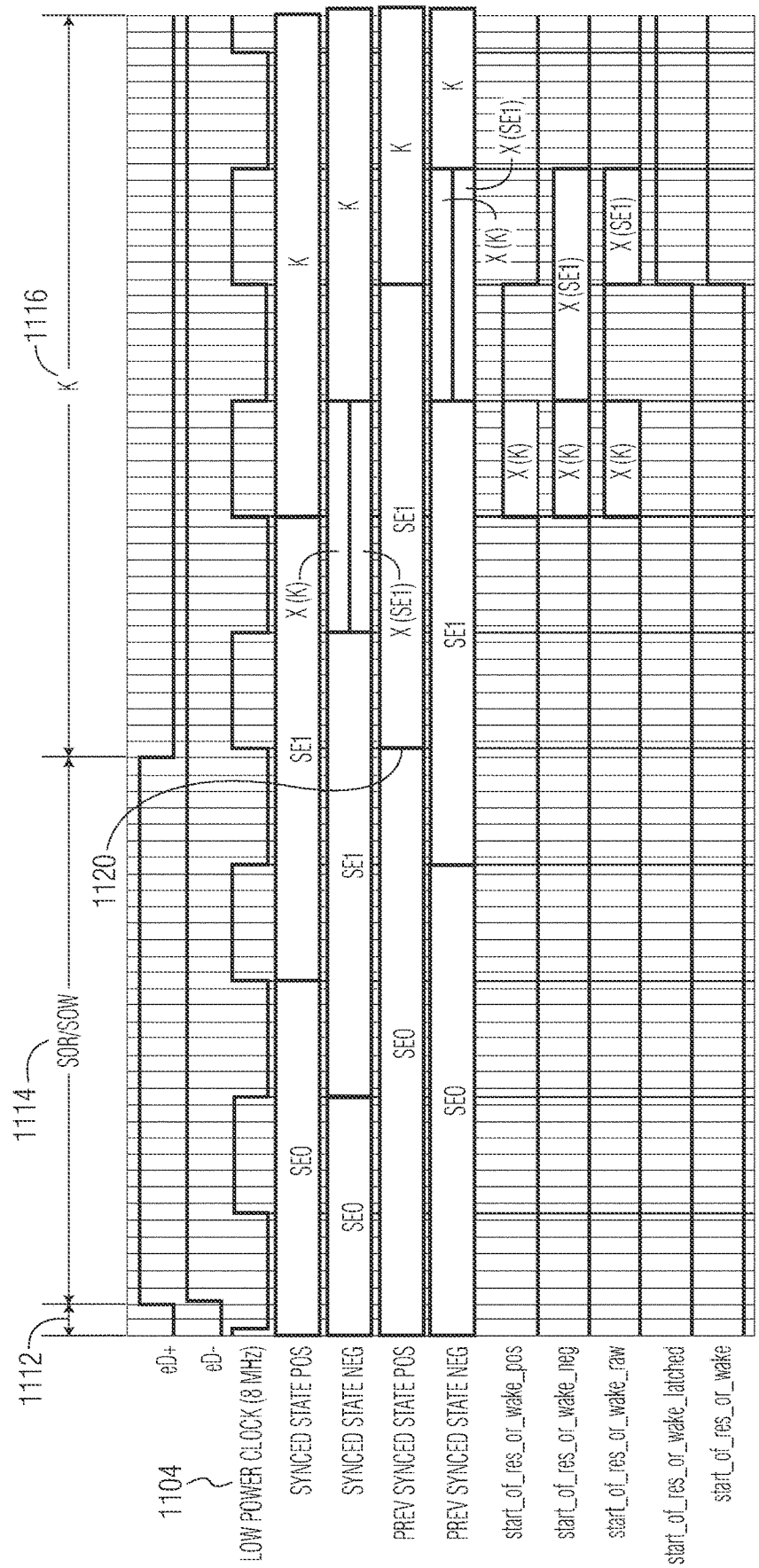
FIG. 11 is a timing diagram of the operation of a detector circuit using a low power clock in response to an incoming SOR or SOW.

FIG. 11 is a timing diagram of the operation of the detector circuit 800 using the same low power 8 MHz clock 1104 but in response to an incoming SOR or SOW (referred to as an SOR for simplicity). The SOR starts again from an idle SE0 1112 that transitions to an SE1 1114 and then to a "K" state 1116 to trigger the SOR. This timing diagram shows the same signals with the low power clock aligned roughly as in the timing diagram of FIG. 9. As in FIG. 9, the synchronized state pos signals and the previous synchronized state pos are generated by a first sync flop or first stage of the positive section using the falling edge of the low power clock and the second sync flop or second stage of the positive section using the rising edge.

The detection timing for SOR may be later than for SCM. The synchronized state neg signal shows sampling at time 1120 at the falling edge of eD+. Therefore eD+ may result in either a "1" indicating SE1 or a "0" indicating a "K" state. So, depending on the result, different "start_of_res_or_wake" indications are generated, as shown.

In the following description and claims, the term "coupled" along with its derivatives, may be used. "Coupled" is used to indicate that two or more elements have a connection that permits interaction but that there may be intervening physical or electrical components between them. "Electrically coupled" is used to indicate that the interaction is electrical as compared to physical, magnetic, or another form of interaction. As used in the claims, unless otherwise specified, the use of the ordinal adjectives "first," "second," "third," etc., to describe a common element, merely indicate that different instances of like elements are being referred to, and are not intended to imply that the elements so described must be in a given sequence, either temporally, spatially, in ranking, or in any other manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An embedded USB (eUSB) repeater having:
   an analog differential transceiver configured to receive a differential data signal from a differential data bus and configured to drive a differential data signal to the differential data bus;
   an analog single-ended transceiver configured to receive a single-ended data signal from a single-ended data bus and configured to drive a single-ended data signal to the single-ended data bus;
   repeater logic coupled to the analog differential transceiver and the analog single-ended transceiver to repeat data signals between the differential data bus and the single-ended data bus,
   the repeater logic having an active state and a low power state; and
   a detection circuit coupled to the analog single-ended transceiver and configured to detect a start signal on the single-ended data bus;
   wherein the detection circuit includes,
      a clock;
      a first state element coupled to detect and store the start signal on a rising edge of the clock; and
      a second state element coupled to capture, on a falling edge of the clock, the start signal stored in the first state element; and
   wherein the detection circuit is configured to generate and send a wake signal to the repeater logic in response to at least one of the first state element detecting the start signal on the rising edge of the clock, and the second state element capturing the start signal on the falling edge of the clock.

2. The repeater of claim 1,
   wherein the repeater logic is in the low power state upon receiving the wake signal.

3. The repeater of claim 1,
   wherein the detection circuit has a suspend mode and wherein the repeater logic sends a reset signal to the detection circuit to place the detection circuit in the suspend mode when the repeater logic is in the active state.

4. The repeater of claim 1,
   wherein the repeater logic comprises high level logic,
   wherein the start signal comprises a start of control message, and
   wherein the detection circuit is configured to send the start of control message to the high level logic.

5. The repeater of claim 1,
   wherein the repeater is a device side eUSB repeater and the start signal comprises a start of wake signal.

6. The repeater of claim 1,
   wherein the repeater is a host side eUSB repeater and the start signal comprises a start of resume signal.

7. The repeater of claim 1,
   wherein the repeater logic has a first clock and the detection circuit has a second clock slower than the first clock.

8. The repeater of claim 1, wherein the detection circuit includes:
   a positive section configured to detect the start signal on the rising edge of the clock and generate a first wake signal;
   a negative section configured to detect the start signal on the falling edge of the clock and generate a second wake signal; and
   a gate coupled to both the positive section and the negative section and configured to pass the first wake signal and the first wake signal in response to the positive section and the negative section detecting the start signal.

9. The repeater of claim 1:
   wherein the first state element is a first sync flop having a clock input coupled to the clock and
   wherein the second state element is a second sync flop also having a clock input coupled to the clock.

10. The repeater of claim 1, further comprising
    a counter coupled to the second state element to receive the start signal transition and to determine a duration of the start signal after the start signal transition and before a next start signal transition.

11. The repeater of claim 10,
    wherein the counter generates a start of control message if the determined duration of the start signal reaches a predetermined counter value.

12. The repeater of claim 1,
    wherein the low power state includes an eUSB L2 state.

13. A host embedded USB (eUSB) repeater comprising:
    an analog differential transceiver configured to receive a USB signal from a USB bus coupled to a remote device and configured to drive a USB signal to the remote device on the USB bus;
    an analog single-ended transceiver configured to receive an eUSB signal from an eUSB bus coupled to a host and configured to drive an eUSB signal to the host on the eUSB bus;
    repeater logic coupled to the analog differential transceiver and the analog single-ended transceiver to repeat data signals between the USB bus and the eUSB bus,
    the repeater logic having an active state and a low power state; and
    a detection circuit coupled to the analog single-ended transceiver to detect a start of resume (SOR) from the host on the eUSB bus;
    wherein the detection circuit includes,
       a clock;
       a first sync flop coupled to detect and store the SOR on a rising edge of the clock; and
       a second sync flop coupled to capture, on a falling edge of the clock, the SOR stored in the first sync flop; and wherein the detection circuit is configured to generate and send a resume signal to the repeater logic in response to at least one of the first sync flop detecting the SOR on the rising edge of the clock, and the second sync flop capturing the SOR on the falling edge of the clock.

14. The repeater of claim 13, wherein the SOR starts with both lines of the eUSB bus being driven high followed by one line going low for several milliseconds.

15. The repeater of claim 14, wherein the detection circuit comprises an AND gate to compare a current detected SOR to a previous stored state of the eUSB bus to detect an SOR.

16. An embedded USB (eUSB) repeater having:
an analog differential transceiver configured to receive a differential data signal from a differential data bus and configured to drive a differential data signal to the differential data bus;
an analog single-ended transceiver configured to receive a single-ended data signal from a single-ended data bus and configured to drive a single-ended data signal to the single-ended data bus;
repeater logic coupled to the analog differential transceiver and the analog single-ended transceiver to repeat data signals between the differential data bus and the single-ended data bus,
the repeater logic having an active state and a low power state; and
a detection circuit coupled to the analog single-ended transceiver and configured to detect a start signal on the single-ended data bus;
wherein the detection circuit includes,
a clock;
a positive section including,
a first state element coupled to detect and store the start signal on a rising edge of the clock; and
a second state element coupled to capture, on a falling edge of the clock, the start signal stored in the first state element; and
a negative section including,
a third state element coupled to detect and store the start signal on the falling edge of the clock; and
a fourth state element coupled to capture, on the rising edge of the clock, the start signal stored in the first state element; and
wherein the detection circuit is configured to generate and send a wake signal to the repeater logic in response to at least one of the first state element detecting the start signal on the rising edge of the clock, the second state element capturing the start signal on the falling edge of the clock, the third state element detecting the start signal on the falling edge of the clock, and the fourth state element capturing the start signal on the rising edge of the clock.

* * * * *